United States Patent [19]
Hamaguchi et al.

[11] Patent Number: 5,430,596
[45] Date of Patent: Jul. 4, 1995

[54] CRT PROTECTOR CIRCUIT

[75] Inventors: Kenji Hamaguchi, Tokyo; Kiyoshi Ogishima, Kanagawa, both of Japan

[73] Assignee: Sony Corporation, Tokyo, Japan

[21] Appl. No.: 177,411

[22] Filed: Jan. 5, 1994

[30] Foreign Application Priority Data

Jan. 13, 1993 [JP] Japan .................................. 5-004245

[51] Int. Cl.⁶ .......................................... H01J 29/70
[52] U.S. Cl. ........................................ 361/86; 361/89; 361/94; 315/411; 348/377
[58] Field of Search ............... 361/42, 59, 65, 91, 361/72, 79, 86, 87, 89, 94; 315/411; 358/190, 243

[56] References Cited

U.S. PATENT DOCUMENTS

| | | | |
|---|---|---|---|
| 4,126,816 | 11/1978 | Willis | 315/411 |
| 4,321,513 | 3/1982 | Knight | 315/411 |
| 4,441,137 | 4/1984 | Harwood | 361/91 |

FOREIGN PATENT DOCUMENTS

0054452A1 9/1990 European Pat. Off. .
22300871 6/1982 Japan .

*Primary Examiner*—Todd Deboer
*Attorney, Agent, or Firm*—Jay H. Maioli

[57] ABSTRACT

A CRT protector circuit for detecting an overcurrent or an overvoltage to a CRT to protect the CRT. A detector circuit is provided for detecting the overcurrent and the overvoltage, and when such is detected an abnormality detection output from the detector circuit is supplied to a control circuit which in turn controls a horizontal output circuit. The operation of the horizontal output circuit, provided on a primary side of a flyback transformer is, instantaneously broken by the control circuit according to the abnormality detection output from the detector circuit. When the frequency of generation of the abnormality detection output becomes a predetermined value or more, the operation of the horizontal output circuit is continuously inhibited. Accordingly, when the abnormal condition is temporary, a normal high-voltage generating operation can be automatically restored.

10 Claims, 3 Drawing Sheets

CRT PROTECTOR CIRCUIT

BACKGROUND OF THE INVENTION

1. Field of the Invention

The present invention relates to a CRT (cathode ray tube) protector circuit for protecting a CRT from an overcurrent or an overvoltage.

2. Description of the Related Art

A CRT for use in a television receiver or the like is provided with a CRT protector circuit on the high-voltage side, so as to protect the CRT itself from an overcurrent which may flow into the CRT or an overvoltage which may be applied to the CRT.

FIG. 1 shows a CRT protector circuit 10 in the related art. Referring to FIG. 1, a horizontal output circuit 12 is driven by a switching signal with a horizontal period at terminal 11. The horizontal output circuit 12 includes a horizontal output transistor Qa as a horizontal output element, and also includes a capacitor C and a damper diode D. The switching signal flows in a primary coil 15a of a flyback transformer (FBT) 15 to thereby allow a high-voltage current increased to a predetermined value to flow in a secondary coil (high-voltage coil) 15b of the flyback transformer 15.

The high-voltage current is rectified by a rectifier circuit 16 to obtain a high voltage HV. The high voltage HV is applied to an anode 21 of a CRT 20. A detector circuit 22 for detecting the high voltage HV is provided in an output stage of the rectifier circuit 16. The detector circuit 22 includes bleeder resistors 22a and 22b. A divided voltage OV obtained at a connection point p between the bleeder resistors 22a and 22b is supplied to a detector circuit 30 for detecting an overvoltage.

The detector circuit 30 functions also as a detector circuit for detecting an overcurrent which may flow through the anode 21 of the CRT 20. The current flowing in the CRT 20 is converted into a voltage OI by a resistor 25 connected to one end of the secondary coil 15b. The detection voltage OI obtained at a connection point q between the secondary coil 15b and the resistor 25 is supplied to the detector circuit 30. A control transistor Qb is controlled by an output from the detector circuit 30.

In this construction, when the high voltage HV is about 27 kV in a normal condition and it abnormally increases to 30 to 32 kV, the detection voltage OV also increases from a normal value to an abnormal value exceeding a reference value REF. Then, the detector circuit 30 detects this abnormal condition and turns on the control transistor Qb which stops the switching operation of the horizontal output transistor Qa. When the switching operation is thus stopped, the high voltage HV decreases to the normal value.

However, although the high voltage HV is returned to the normal value, the control transistor Qb holds in the on-state. Accordingly, once the abnormal condition is detected by the detector circuit 30, it is necessary to supply power again to restore the normal condition. If the abnormal condition is a permanent abnormal condition, it is necessary to change an abnormal element.

Also when an abnormal current (overcurrent) greater than the normal value flows into the CRT 20, the abnormal current is converted into the voltage OI by the resistor 25. If the voltage OI exceeds the reference value REF, the same control as that mentioned above is performed to prevent the breakdown of the CRT 20 due to the overcurrent. Also in this case, it is necessary to supply power again to restore the normal condition.

As described above, once the overvoltage or the overcurrent is detected in the above construction as shown in FIG. 1, it is necessary to supply power again to restore the normal condition. Accordingly, when the current is abnormally increased by an instantaneous internal discharge in the CRT 20 and the detector circuit 30 is operated, the image displaying operation of the television receiver remains stopped, in spite of the situation that the above discharge is stopped to restore a normal condition of the CRT 20.

Although the television receiver can be restored to the normal condition by supplying power again, the operation stop of the television receiver is apt to be misunderstood as a fatal fault by a user. That is, the user cannot determine whether the operation stop of the television receiver is a temporary protector operation or a fault such that any circuit element is necessary to exchange. Thus, the protector circuit shown in FIG. 1 is lacking in reliability.

SUMMARY OF THE INVENTION

It is accordingly an object of the present invention to provide a CRT protector circuit which can automatically determine whether or not the abnormal condition is a temporary abnormal condition which can be removed to restore a normal condition, and which can automatically restore the normal condition when the temporary abnormal condition is detected.

According to the present invention, there is provided a CRT protector circuit for detecting an overcurrent or an overvoltage to a CRT to protect the CRT. The CRT protector circuit is characterized in that it is comprised of a detector circuit for detecting the overcurrent and the overvoltage, and when such are detected, an abnormality detection output from the detector circuit is supplied to a control circuit for controlling a horizontal output circuit. The operation of the horizontal output circuit, provided on the primary side of the flyback transformer, is instantaneously broken by the control circuit according to the abnormality detection output, and when the frequency of generation of the abnormality detection output becomes a predetermined value or more, the operation of the horizontal output circuit is continuously inhibited.

As shown in FIG. 2, the control circuit as denoted by reference numeral 40 is preferably constructed as a microcomputer, and every time an abnormal condition such as an overvoltage or an overcurrent is generated, the control transistor Qb is instantaneously controlled, but is reset at once to wait for detection of the next abnormal condition (see steps 55 and 56 in FIG. 3).

When the abnormal condition is a temporary abnormal condition, the control transistor Qb is turned off to restore a normal high-voltage generating operation and restart this normal operation. Thus, the detection of the abnormal condition is ended to automatically restore the normal operation.

On the other hand, when the abnormal condition is a permanent abnormal condition, the control transistor Qb is repeatedly turned off to restore the normal high-voltage generating operation, but the detection of the abnormal condition is continued. Then, if the number of the repetition of the detection becomes a predetermined value, the abnormal condition is determined as the permanent abnormal condition and the on-state of the control transistor Qb is continued. In this case, even if power is supplied again, the normal condition is not restored.

Other objects and features of the invention will be more fully understood from the following detailed description and appended claims when taken with the accompanying drawings.

DETAILED DESCRIPTION OF THE PREFERRED EMBODIMENTS

A preferred embodiment of the CRT protector circuit according to the present invention applied to the above-mentioned television receiver will now be described with reference to the drawings.

Figure 1:
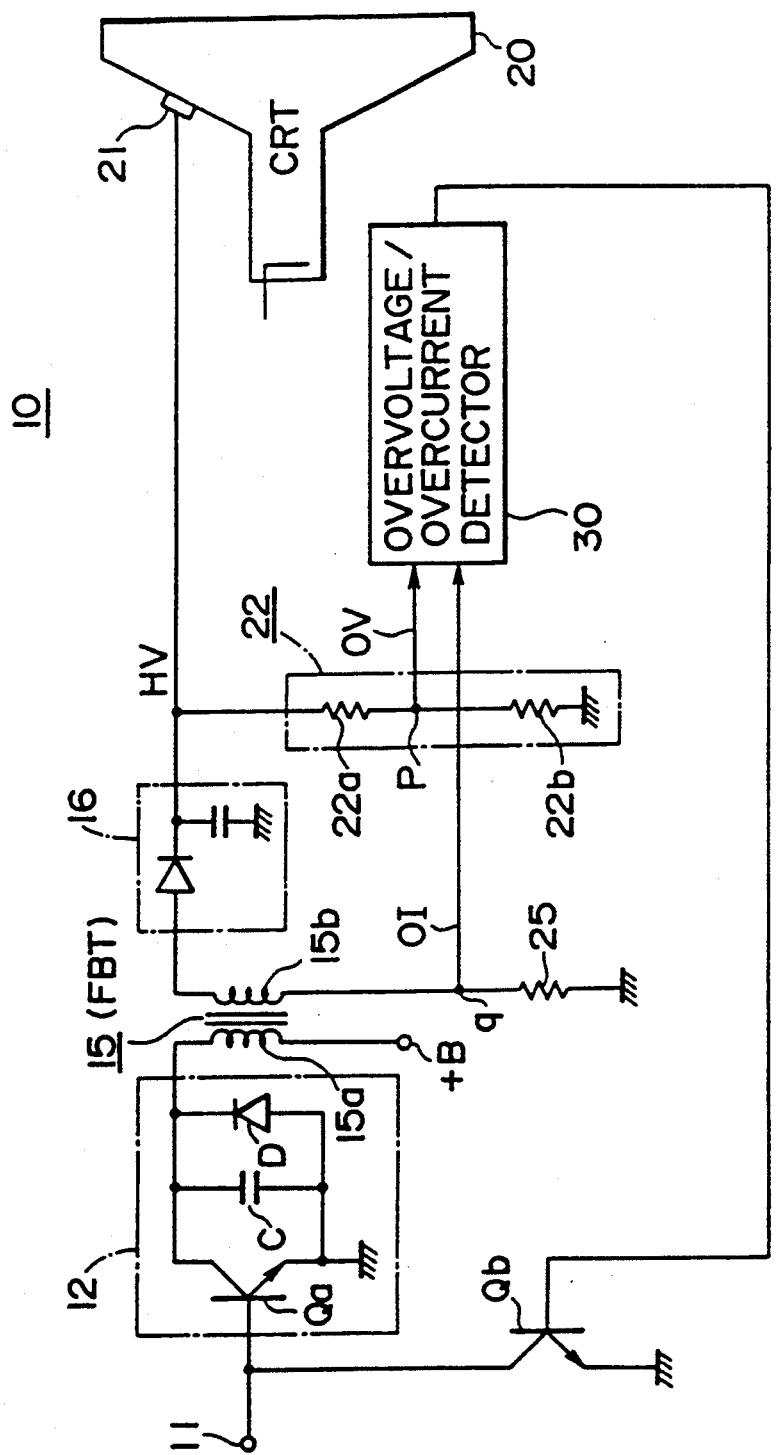
FIG. 1 is a connection diagram of a CRT protector circuit in the related art.
Figure 2:
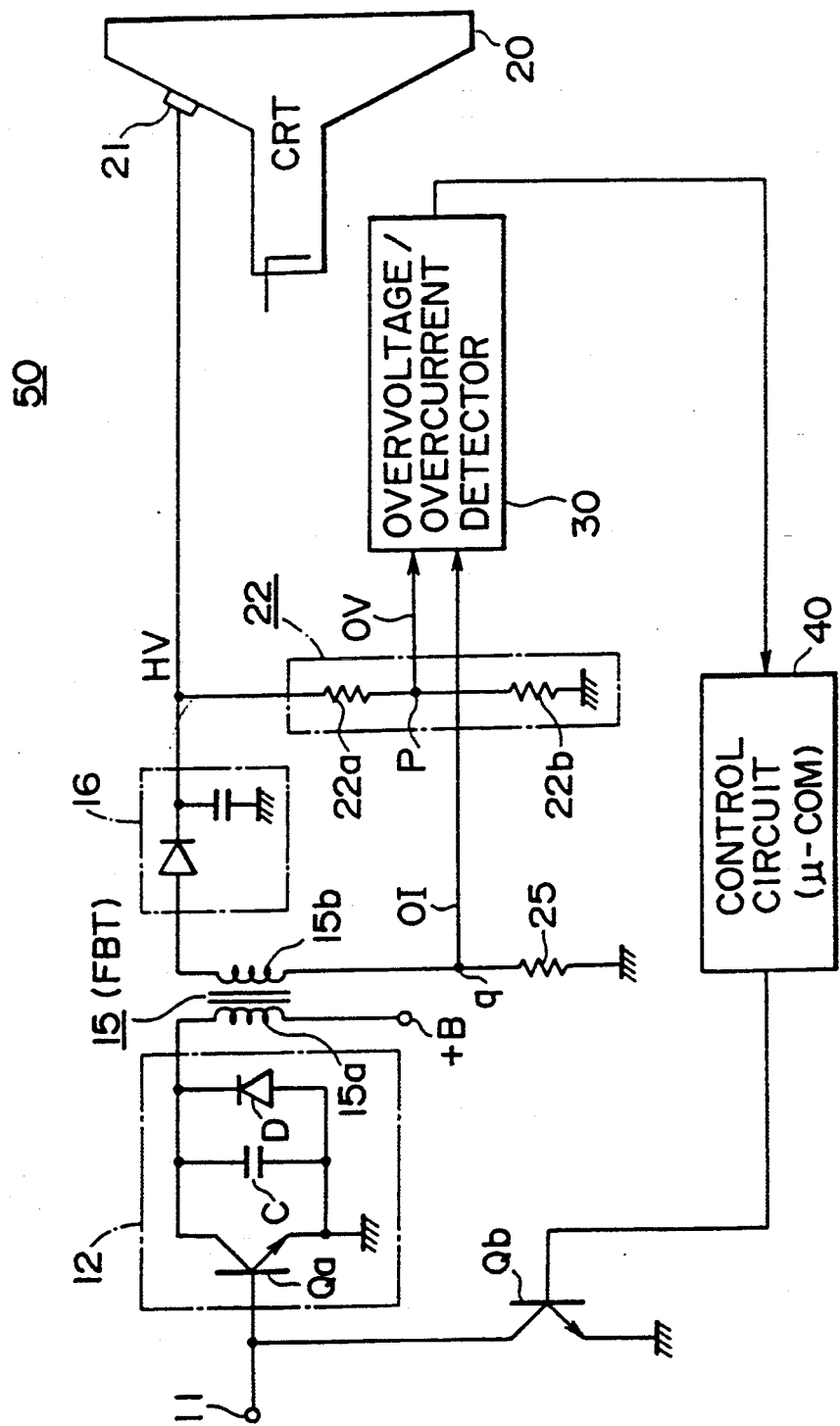
FIG. 2 is a connection diagram of a CRT protector circuit according to the present invention.

FIG. 2 shows a CRT protector circuit 50 according to the preferred embodiment of the present invention. Also in this preferred embodiment, a high-voltage generating operation similar to that in the related art mentioned above is performed, and a high voltage HV obtained by this generating operation is supplied to an anode 21 of a CRT 20 as similarly performed in the related art. Further, a detecting system for protecting the CRT 20 from an overvoltage or an overcurrent is also similar to that in the related art. Accordingly, the explanation of the parts substantially the same as those in the related art will be omitted hereinafter.

In the CRT protector circuit 50 according to the preferred embodiment, an abnormal condition detected by a detector circuit 30 is transmitted to a control circuit 40 constructed as a microcomputer, and an operating condition of the control transistor Qb is controlled by an output from the control circuit 40. The control circuit 40 determines whether the abnormal condition detected by the detector circuit 30 is a temporary abnormal condition or a permanent abnormal condition, and controls the control transistor Qb either temporarily or permanently according to the result of determination.

Figure 3:
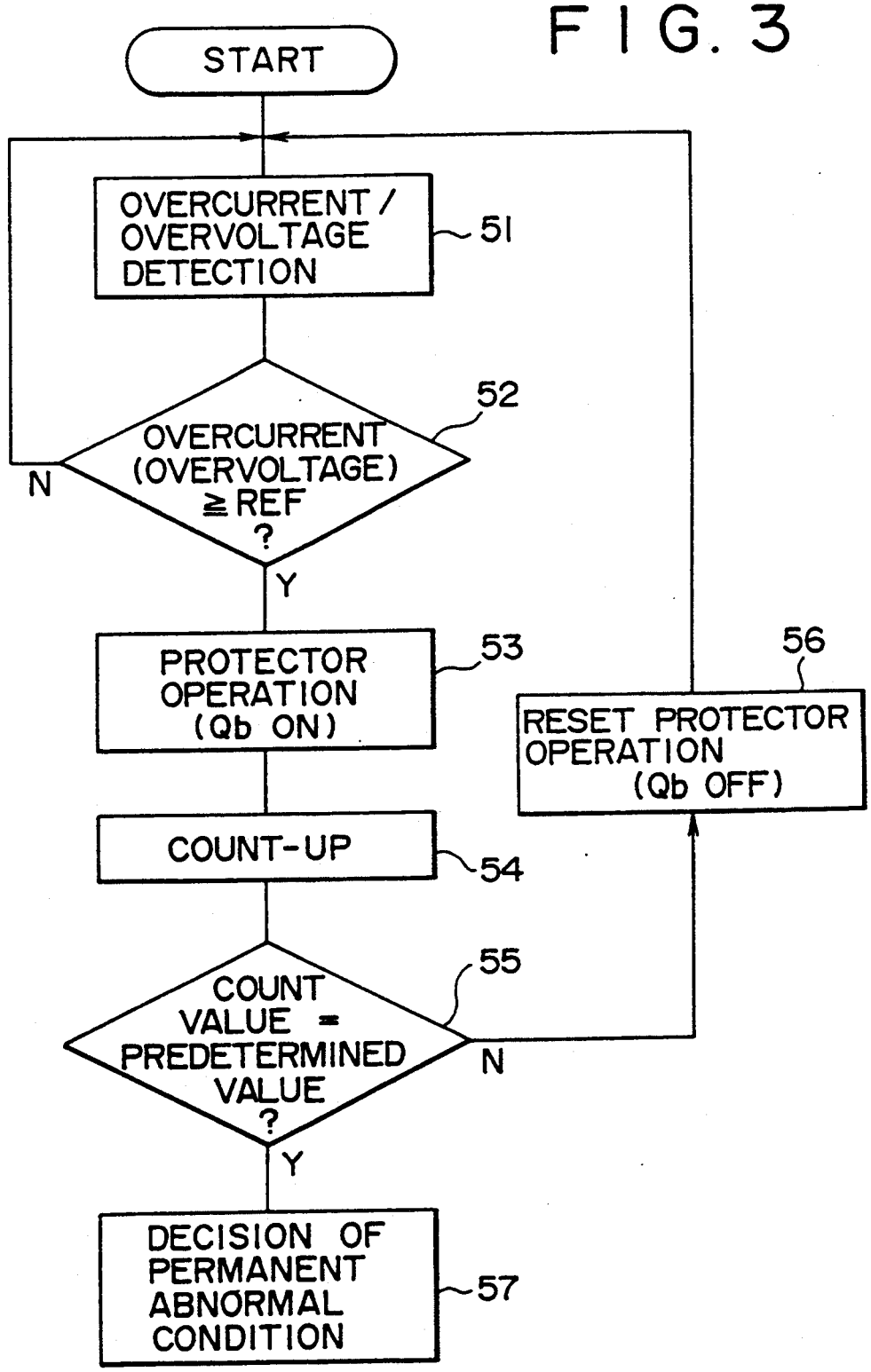
FIG. 3 is a flowchart illustrating the operation of the CRT protector circuit shown in FIG. 2.

FIG. 3 is a flowchart showing the operation of the control circuit 40 in performing the above determination in a software controlled manner. Referring to FIG. 3, when an abnormal condition such as an overvoltage or an overcurrent is detected (steps 51 and 52), a protector operation is performed at once (step 53). The protector operation in effect turns on the control transistor Qb and thereby stops the switching control of a horizontal output transistor Qa as mentioned above.

When this protector operation is performed once, a count-up (or count-down) operation is started, and the count value is compared with a predetermined value (steps 54 and 55). A numerical value, such that there is no possibility of continuous generation of the temporary abnormal condition, is selected as the predetermined value. In the case of adopting the count-up operation, a numerical value of "3" is selected as the predetermined value in this preferred embodiment.

If the count value is less than the predetermined value, the protector operation is reset at once (step 56). That is, the control transistor Qb is returned to an off-state. When the control transistor Qb is turned off, the normal switching operation of the horizontal output transistor Qa is restored to continue the abnormal condition detecting mode (step 51 and the subsequent steps).

Accordingly, when the abnormal condition detected is determined as the temporary abnormal condition, the control transistor Qb is turned off to restore the normal high-voltage generating operation and resume this operation. Then, the abnormal condition detecting operation is ended, land the normal operation is automatically restored.

Every time the protector operation is reset in step 56 to restore the normal high-voltage generating operation, the detection of the abnormal condition is repeatedly performed in step 51. When the count value, i.e., the number of repetitions of the detection of the abnormal condition reaches the predetermined value, the abnormal condition is determined as a permanent abnormal condition, and the on-state of the control transistor Qb is continued (steps 55 and 57). In this case, even if power is supplied again, the normal condition is not restored.

Such a permanent abnormal condition may be visually informed the user by lighting an alarm lamp.

The determination of whether the count value is less than the predetermined value may be effected by counting the frequency of the generation of the abnormal condition during a given period of time and then comparing the count value during this period of time with the predetermined time. In this case, when the given period of time elapses, a counter is automatically reset to restore an initial condition. Accordingly, even when the temporary abnormal condition is intermittently generated, it is possible to prevent the operation when the protector circuit will malfunction.

The detection of the overvoltage may be effected by using a voltage detecting coil (tertiary coil) (not shown) provided in a flyback transformer 15.

The numerical value selected as the predetermined value and the other limitations mentioned above are merely illustrative, and they may be adaptively decided. Further, a connecting position of the control transistor Qb is not limited to that shown.

As described above, the CRT protector circuit according to the present invention can automatically determine whether the abnormal condition is a temporary abnormal condition, or a permanent abnormal condition and can automatically reset the protector operation to restore the normal condition when the abnormal condition is determined as the temporary abnormal condition.

In other words, when the abnormal condition is determined as the permanent abnormal condition, the normal operation cannot be restored. Accordingly, the user can easily determine whether the operation stop of the television receiver is a temporary protector operation or a fatal fault such that any circuit element is necessary to exchange. Thus, the reliability can be greatly improved. Accordingly, the present invention is greatly advantageous as a CRT protector circuit for use in a television receiver or the like.

While the invention has been described with reference to specific embodiments, the description is illustrative and is not intended to be construed as limiting the scope of the invention. Various modifications and changes may occur to those skilled in the art without departing from the spirit and scope of the invention as defined by the appended claims.

What is claimed is:

1. A protector circuit for a cathode ray tube, comprising:
   a flyback transformer receiving a switching signal with a horizontal scanning period;
   a rectifier circuit supplied with an output voltage from a secondary coil of said flyback transformer;
   an anode of said cathode ray tube receiving an output signal from said rectifier circuit;
   a detector circuit receiving said output signal from said rectifier circuit for detecting an abnormal condition and generating an output indicative thereof;
   a cut-off circuit provided on a primary coil side of said flyback transformer for cutting off said switching signal when said abnormal condition is detected by said detector circuit; and
   a control circuit connected to receive said output from said detector circuit for continuously inhibiting an output from said flyback transformer when a frequency of generation of said abnormal condition detected by said detector circuit becomes a predetermined value or more.

2. A protector circuit according to claim 1, wherein said control circuit comprises a microcomputer, and said frequency of generation of said abnormal condition detected by said detector circuit is detected by said microcomputer in a software controlled manner.

3. A protector circuit according to claim 2, further comprising a horizontal output circuit for generating said switching signal with said horizontal scanning period including a horizontal output element connected to said flyback transformer, said horizontal output element being controlled in on/off operation by said control circuit.

4. A protector circuit according to claim 3, wherein when said frequency of generation of said abnormal condition detected by said detector circuit is less than said predetermined value, said cut-off circuit is turned off.

5. A protector circuit according to claim 4, further comprising means for indicating a condition where said output from said flyback transformer is continuously inhibited.

6. A cathode ray tube having a protector circuit which comprises:
   a flyback transformer receiving a switching signal with a horizontal scanning period;
   a rectifier circuit supplied with an output voltage from a secondary coil of said flyback transformer;
   an anode of said cathode ray tube receiving an output signal from said rectifier circuit;
   a detector circuit receiving said output signal from said rectifier circuit for detecting an abnormal condition and generating an output indicative thereof;
   a cut-off circuit provided on a primary coil side of said flyback transformer for cutting off said switching signal when said abnormal condition is detected by said detector circuit; and
   a control circuit connected to receive said output from said detector circuit for continuously inhibiting an output from said flyback transformer when a frequency of generation of said abnormal condition detected by said detector circuit becomes a predetermined value or more.

7. A cathode ray tube according to claim 6, wherein said control circuit comprises a microcomputer, and said frequency of generation of said abnormal condition detected by said detector circuit is detected by said microcomputer in a software controlled manner.

8. A cathode ray tube according to claim 7, further comprising a horizontal output circuit for generating said switching signal with said horizontal period including a horizontal output element connected to said flyback transformer, said horizontal output element being controlled in on/off operation by said control circuit.

9. A cathode ray tube according to claim 8, wherein when said frequency of generation of said abnormal condition detected by said detector circuit is less than said predetermined value, said cut-off circuit is turned off.

10. A cathode ray tube according to claim 9, further comprising means for indicating a condition where said output from said flyback transformer is continuously inhibited.

* * * * *